United States Patent
Letts et al.

(10) Patent No.: US 6,778,931 B1
(45) Date of Patent: Aug. 17, 2004

(54) TEST AND MEASUREMENT INSTRUMENT HAVING MULTI-CHANNEL TELECOMMUNICATIONS MASK TESTING CAPABILITY

(75) Inventors: Peter J. Letts, Beaverton, OR (US); Steven C. Herring, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 292 days.

(21) Appl. No.: 09/619,067

(22) Filed: Jul. 19, 2000

Related U.S. Application Data

(60) Provisional application No. 60/155,977, filed on Sep. 24, 1999.

(51) Int. Cl.[7] .............................................. G06F 19/00
(52) U.S. Cl. ....................................... 702/117; 345/690
(58) Field of Search .............................. 702/57, 66–71, 702/73, 74, 117, 118, 120, 122, 124, 126, 183, 185, 186; 345/173, 177, 179, 440, 440.01, 660, 690, 694; 259/310; 250/310

(56) References Cited

U.S. PATENT DOCUMENTS

| | | | | |
|---|---|---|---|---|
| 4,476,386 A | * | 10/1984 | Reid et al. ................... | 250/310 |
| 5,337,403 A | * | 8/1994 | Klingman .................... | 345/440 |
| 5,929,842 A | * | 7/1999 | Vertregt et al. ............. | 345/690 |
| 5,959,637 A | * | 9/1999 | Mills et al. .................. | 345/506 |
| 6,069,607 A | * | 5/2000 | Everett et al. ............... | 345/660 |
| 6,104,374 A | * | 8/2000 | Sullivan et al. ............. | 345/694 |
| 6,219,029 B1 | * | 4/2001 | Flakne et al. ................ | 345/690 |
| 6,249,115 B1 | * | 6/2001 | Yost et al. .................... | 324/88 |
| 6,252,608 B1 | * | 6/2001 | Snyder et al. ............... | 345/473 |

FOREIGN PATENT DOCUMENTS

| | | |
|---|---|---|
| EP | 0869368 | 10/1998 |

OTHER PUBLICATIONS

Patent Abstracts of Japan, vol. 014, No. 340 (P–1080), Jul. 23, 1990 & JP 02116757A (Iwatsu Electric Co. Ltd.), May 1, 1990, Abstract.

Patent Abstracts of Japan, vol. 017, No. 448 (P–1594), Aug. 17, 1993 & JP05099965 A (NEC Corp), Apr. 23, 1993, Abstract.

* cited by examiner

*Primary Examiner*—Marc S. Hoff
*Assistant Examiner*—Mohamed Charioui
(74) *Attorney, Agent, or Firm*—Thomas F. Lenihan; Francis I. Gray

(57) ABSTRACT

In a test and measurement instrument having M signal input channels, individual samples representing a signal from each channel are compared to mask pixels to detect non-compliance with a given specification. Initial mask and waveform positions on a display screen of the oscilloscope are determined by an AUTOSET TO MASK function. Comparison of mask pixels and waveform pixels to detect collision between a waveform pixel and a mask pixel (i.e., a mask violation) is performed substantially in real time, as the pixels are being composited into a raster memory by a rasterizer. Acquisitions are performed simultaneously and repeatedly. Acquired waveforms from all M signal input channels are sequentially compared to the mask and drawn on screen during the following acquisition period. Thus, M waveforms can be tested for compliance with a telecom mask substantially within a single acquisition time period. A system employing a multiplexer can select M channels at a time from a group of N channels to decrease the time required to test all N channels. The intensity of pixels representing samples violating the mask is preferably increased for better visibility against the telecom mask.

18 Claims, 4 Drawing Sheets

TEST AND MEASUREMENT INSTRUMENT HAVING MULTI-CHANNEL TELECOMMUNICATIONS MASK TESTING CAPABILITY

CLAIM FOR PRIORITY

The subject application hereby claims priority from U.S. Provisional Patent Application Ser. No. 60/155,977, entitled TELECOMMUNICATIONS MASK TESTING, filed Sep. 24, 1999 in the names of Peter J. Letts and Steven C. Herring.

CROSS REFERENCE TO RELATED APPLICATIONS

The subject application is related to U.S. patent application Ser. No. 09/602,575 filed on 22 Jun. 2000, bearing entitled A TEST AND MEASUREMENT INSTRUMENT HAVING TELECOMMUNICATIONS MASK TESTING CAPABILITY WITH AN AUTOFIT TO MASK FEATURE, (Letts) assigned to the same assignee as the subject application, and also claiming priority from the above-identified U.S. Provisional application, and to U.S. patent application Ser. No. 09/607,573 filed on 29 Jun. 2000, bearing entitled A TEST AND MEASUREMENT INSTRUMENT HAVING TELECOMMUNICATIONS MASK TESTING CAPABILITY WITH A MASK ZOOM FEATURE, (Letts), assigned to the same assignee as the subject application, and also claiming priority from the above-identified U.S. Provisional application.

FIELD OF THE INVENTION

The subject invention generally concerns test and measurement instruments, and in particular concerns those test and measurement instruments employing telecom mask features.

BACKGROUND OF THE INVENTION

In the telecommunications industry, it is commonplace to perform a test to determine if a particular signal is in compliance with parameters established by national and international communications standards bodies such as ITU-T and ANSI. A primary way to perform such a compliance test is to compare the pulse shape of a waveform acquired by an oscilloscope to a waveform "mask". The mask defines a pathway having minimum and maximum amplitude values, predetermined bit rate, and defined minimum slope on signal edges (i.e., minimum bandwidth). If the signal under test stays within the pathway boundaries, then the signal passes the test. This kind of test is known as Telecom Mask Testing.

A recent innovation in oscilloscope features has been a "AUTOSET TO MASK" function. The AUTOSET TO MASK function automatically sets up the horizontal, vertical, and triggering settings on the oscilloscope to accommodate the expected signal, and overlays a mask on the oscilloscope display. The procedure followed in the operation of an AUTOSET TO MASK function is to set the horizontal and vertical scales to a nominal value, acquire a waveform, and adjust the scale and position of the waveform by adjusting the settings of the input A/D converters, and display the mask.

After an AUTOSET TO MASK function sets up the acquired waveform and displays the mask, the telecom mask testing software checks for intrusions into the mask area by the waveform being tested (i.e., violations, or mask hits) that would indicate that the waveform does not comply with applicable telecommunications standards.

In the telecommunications industry, it has been observed that higher core and access data rates require higher capacity line cards, also known as network interface cards. Such high capacity line cards can down convert an STMIE signal (156 Mbits per second) to 63 channels of E1 signals (2 Mbits per second). As multi-channel devices are designed into network interface cards, the need for high-speed pass/fail testing of multiple channels becomes critical.

What is needed is a high-speed solution to the problem of testing telecom signals of multiple channels of telecommunications equipment for compliance with a telecommunications standard.

SUMMARY OF THE INVENTION

In a test and measurement instrument having M signal input channels, individual samples representing a signal from each channel are compared to mask pixels to detect noncompliance with a given specification. Initial mask and waveform positions on a display screen of the oscilloscope are determined by an AUTOSET TO MASK function. Comparison of mask pixels and waveform pixels to detect collision between a waveform pixel and a mask pixel (i.e., a mask violation) is performed substantially in real time, as the pixels are being composited into a raster memory by a rasterizer. Acquisitions are performed simultaneously and repeatedly. Acquired waveforms from all M signal input channels are sequentially compared to the mask and drawn on screen during the following acquisition period. Thus, M waveforms can be tested for compliance with a telecom mask substantially within a single acquisition time period. A system employing a multiplexer can select M channels at a time from a group of N channels to decrease the time required to test all N channels. The intensity of pixels representing samples violating the mask is preferably increased for better visibility against the telecom mask.

DETAILED DESCRIPTION OF THE DRAWING

Figure 1:
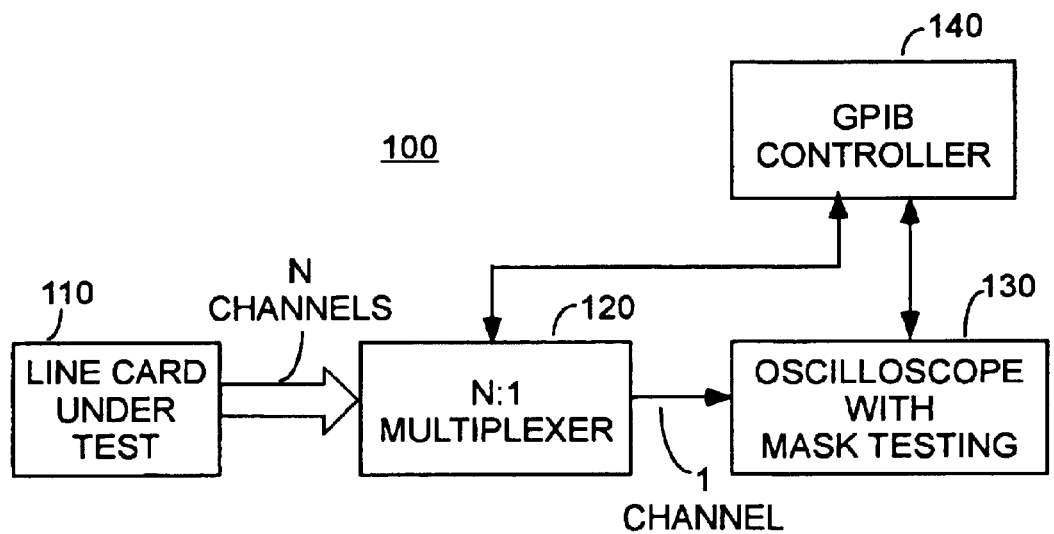
FIG. 1 shows a multiple channel telecom mask testing arrangement in accordance with the prior art.

FIG. 1 is a simplified illustration of a multiple channel telecom mask testing arrangement 100 according to the prior art. A line card under test includes N channels of telecom signals to be tested for compliance with a telecom standard.

The N channels (typically 63 channels) are applied to an N-to-1 Multiplexer 120 (typically a 63-to-1 multiplexer). The single output signal of Multiplexer 120 is applied to a signal input terminal of a single channel of an oscilloscope 130 having telecom mask testing capability.

In operation, oscilloscope 130 acquires a signal and determines if the signal has passed or failed the mask test. This sequence is then repeated N times, for example, sixty-three times, to check each channel of fine card 110. Multiplexer 120 and oscilloscope 130 are under control of a GPIB controller 140. GBIB controller 140 may be a microprocessor, microcomputer, or a dedicated ASIC controller, having GPIB (general purpose interface bus) control capability. In the apparatus of FIG. 1, only one channel at a time is tested against the mask. Therefore, GPIB CONTROLLER 140 must send sixty-three separate switching control commands to MULTIPLEXER 120. If settling time is required after each multiplexer switch selection, then the total time for testing the entire LINE CARD 110 increases accordingly. Understandably, speed in testing of multi-channel line cards is of critical importance to the telecom industry.

Figure 2:
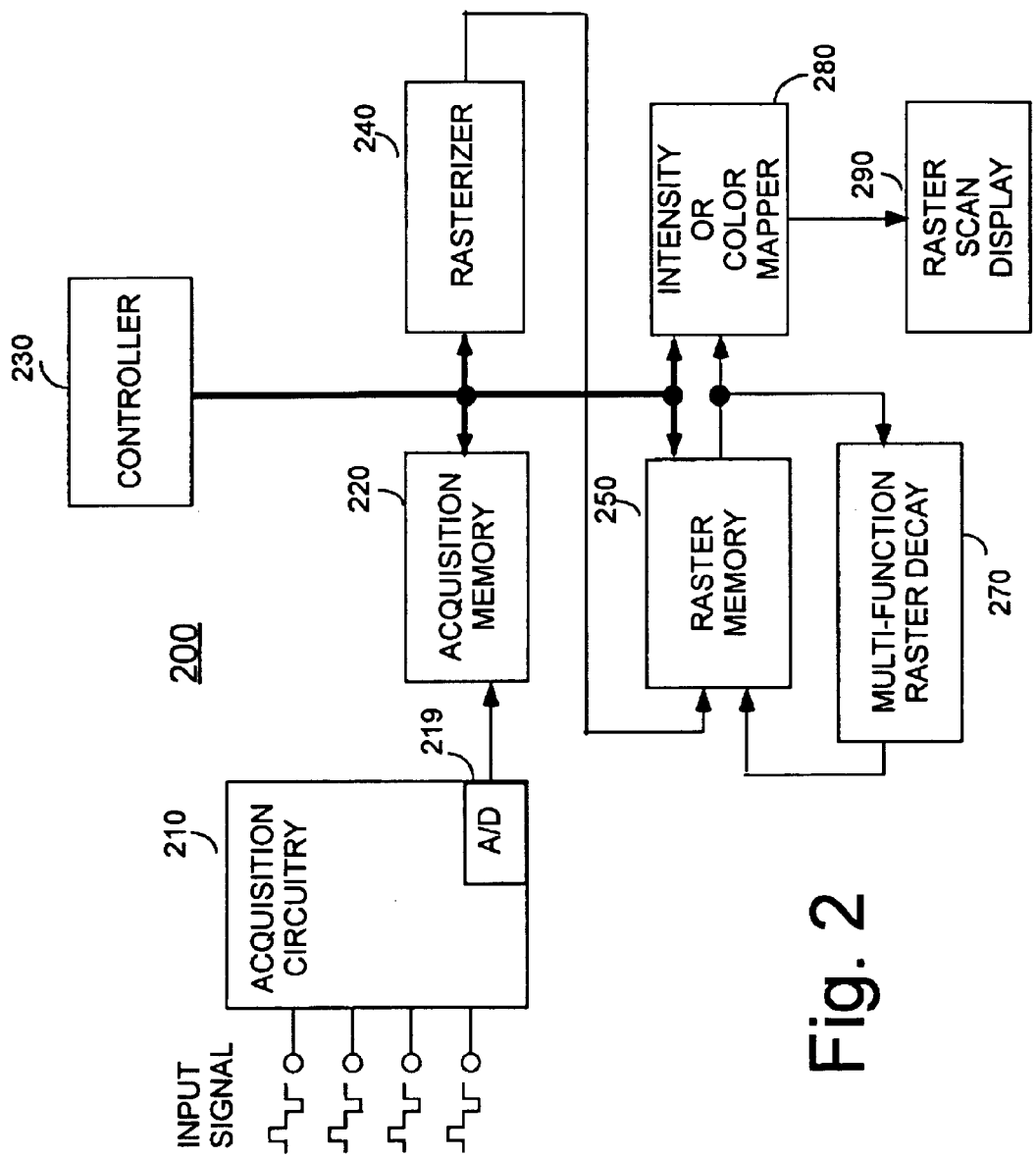
FIG. 2 is a simplified schematic of an oscilloscope suitable for use with the invention.

It is important to note that heretofore, no oscilloscope was capable of substantially simultaneous (i.e., within a single signal acquisition) testing of more than one channel with respect to a telecom mask. The subject invention takes advantage of the hardware architecture shown in FIG. 2 to greatly reduce the time required to perform telecom testing of multi-channel line cards. FIG. 2 shows, in simplified block diagram form, a four-channel digital oscilloscope 200 useful for practicing the invention. Such an oscilloscope may be, for example, a TDS-3054 Digital Phosphor Oscilloscope (DPO) manufactured by Tektronix, Inc., Beaverton, Oreg. Input signals are applied to ACQUISITION CIRCUITRY 220 including an A/D (analog to digital) converter 219. ACQUISITION CIRCUITRY 220 substantially continuously samples the applied input signals at high speed and stores the samples in an ACQUISITION MEMORY 220.

In operation, digital oscilloscope 200 acquires information about the behavior of input signals (i.e., waveforms) by periodically sampling the voltage present at the points where probes (not shown for simplicity) are in contact with individual nodes of a circuit under observation. As noted above oscilloscope 200 of FIG. 2 represents a four channel digital oscilloscope, such as a TDS 3054 DPO. Although four channels are preferred, the subject invention is also useful with a two-channel oscilloscope. The oscilloscope probe and front end of oscilloscope 200 are designed to precisely replicate the signal, or some predetermined fraction or multiple of the signal, and present it to A/D converter 219. The output of A/D converter 219 is a series of multi-bit digital words that are stored in ACQUISITION MEMORY 220. Successively acquired samples are stored at sequentially related addresses in the acquisition memory, and are thereby related to a time scale. Data at those addresses will eventually be converted back to a time scale by a RASTERIZER 240, and stored in a RASTER MEMORY 250. Display hardware such as INTENSITY OR COLOR MAPPER 280 reads the contents of RASTER MEMORY 250 and applies the data to a RASTER SCAN DISPLAY 290. The time scale, referred-to above, is represented as horizontal distance along the x-axis of the oscilloscope's RASTER SCAN DISPLAY 290.

For purposes of background information, a raster consists of horizontal rows and vertical columns. Each row can be identified by a location number along the vertical axis (y-axis), while each column can be identified by a location number along the horizontal axis (x-axis). Typically, in a digital oscilloscope, voltage amplitude values derived from the data contents of an acquisition memory location determine the vertical location (row number) of an illuminated pixel, while time values derived from the addresses of the acquisition memory determine the horizontal location (column number). The process of expanding the contents and addresses of an acquisition memory to produce contents for a two dimensional raster memory is known as "rasterization".

RASTERIZER 240 forms a composite multi-bit grayscale waveform by reading the contents of ACQUISITION MEMORY 220, reading the contents of the relevant location of RASTER MEMORY 250, combining the two and storing (i.e., compositing) the resulting value back into RASTER MEMORY 250. At substantially the same time, a MULTI-FUNCTION RASTER DECAY unit 270 reads the contents of RASTER MEMORY 250 and decrements the data at a predetermined rate, and stores the decayed value back into RASTER MEMORY 250 for later display. All of the above-described functions may operate under control of a controller 230, which may be, for example, a PowerPC G3 microprocessor, a dedicated ASIC, or alternatively, controller 230 may be implemented as multiple processors.

Figure 3:
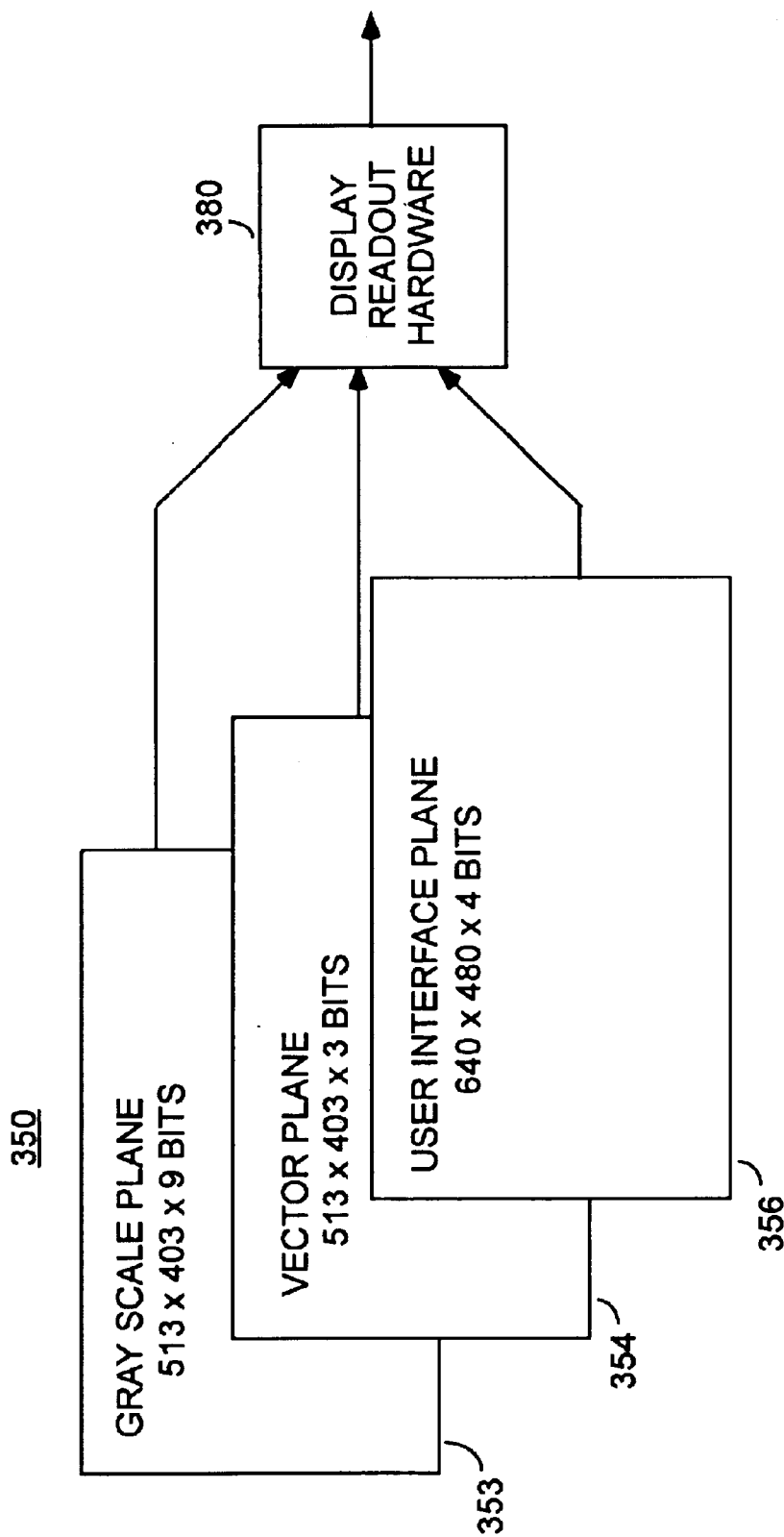
FIG. 3 is a simplified representation of the planes of memory employed by the apparatus of FIG. 2.

RASTER MEMORY 250 is shown in greater detail as RASTER MEMORY 350 in FIG. 3. RASTER MEMORY 350 comprises three planes of memory, a GRAY SCALE (GS) PLANE 353, a VECTOR PLANE 354, and a UI (User Interface) PLANE 356. One skilled in the art will realize that while it is easy to think of this structure in terms of memory "planes", they are really just contiguous blocks of fast SRAM display memory.

Waveform data is written into GS PLANE 353, which is an array of 205,824 memory locations arranged in a 512 by 402 matrix, with each memory location being nine bits long. The nine bits define intensity, color, and whether the pixel is a mask pixel or a waveform pixel.

VECTOR PLANE 354 is used for displaying waveforms resulting from mathematical operations (for example, the sum of the signals from channel 1 and channel 2), or for displaying a previously stored reference waveform. VECTOR PLANE 354 is an array of 205,824 memory locations arranged in a 512 by 402 matrix, with each memory location being two bits long. It is noted in passing that two bits will define three levels of illumination and the "OFF" state for a given pixel.

UI PLANE 356 is used to store pixel data associated with text characters, and it encompasses the entire 640 by 480 screen area. Thus, UI PLANE 356 is an array of 207,200 memory locations arranged in a 640 by 480 matrix, with each memory location being four bits long. The four bits define color and illumination level for a given pixel.

The output signals from the three planes 353, 354, and 356 are read out and combined for display in DISPLAY READOUT HARDWARE unit 380, typically at a 60 Hz rate.

Figure 4:
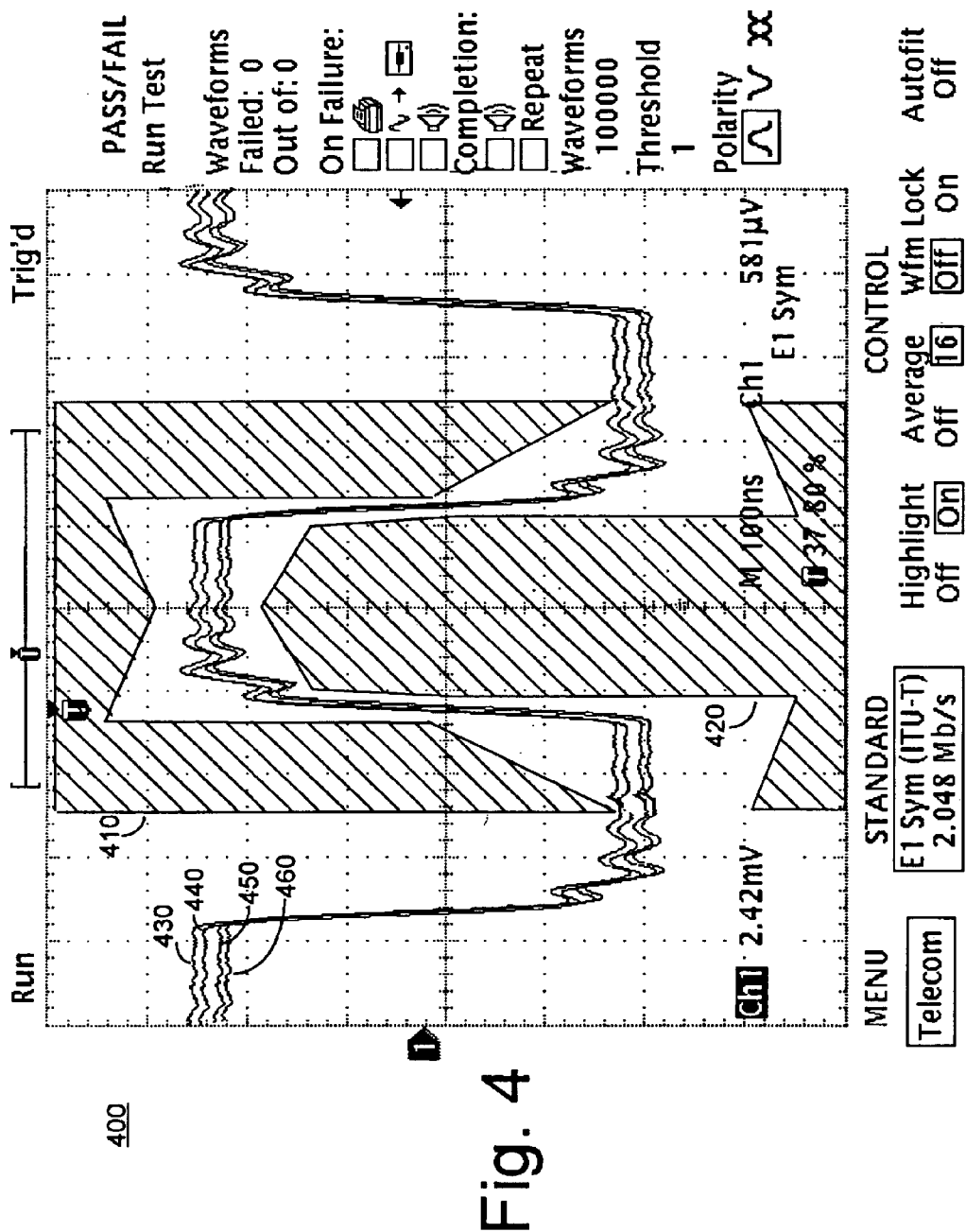
FIG. 4 shows a screen display of a telecom mask and multiple waveforms in accordance with one embodiment of the subject invention.

FIG. 4 shows two parts of a typical telecom mask 410, 420 displayed on a display screen of an oscilloscope. Controller 230 of FIG. 2 draws the telecom mask into display memory. It is drawn as a series of polygons (e.g. trapezoids) defined by a series of stored X-Y points. The telecom mask may be drawn into either of two memory planes depending upon its ultimate purpose. If the purpose is simply to view the telecom mask, or to move it about the screen, then it is drawn into VECTOR PLANE 354. However, if the purpose is to perform a comparison with waveform data as in copending U.S. patent application Ser. No. 09/602,575 entitled A TEST AND MEASUREMENT INSTRUMENT HAVING TELECOMMUNICATIONS MASK TESTING CAPABILITY WITH AN AUTOFIT TO MASK FEATURE, (Lefts), (herein incorporated by reference) then the. telecom mask is drawn into the GS PLANE 352. This is required because the rasterizer must have access to both the waveform data and the telecom mask data in order to detect violations (i.e., make a collision determination) between the two, as the pixels are being drawn into GS PLANE 352 of RASTER MEMORY 350.

Referring to FIG. 4, a display screen 400 of a digital oscilloscope, or the like, has displayed thereon, a telecom mask having an upper portion 410 and a lower portion 420. Each of upper portion 410 and lower portion 420 comprises individual segments composed of polygons (e.g., trapezoids).

Assume that an AUTOSET TO MASK feature has placed telecom mask 410, 420 on the display screen (written it into RASTER MEMORY 250) and has acquired and adjusted waveform 430, 440, 450, and 460 to nominal values. A portion of the AUTOFIT TO MASK function (referred to above) now takes control, and prevents decay of any pixel data in the mask area (so that the mask does not have to be continually redrawn).

Recall that existing data is read out of the relevant location of GS PLANE 353 of RASTER MEMORY 350 before new data is written into it. The existing data is combined with the new data for implementing the incrementing portion of the gray scaling feature (the decrementing portion of the gray scaling feature being accomplished by MULTI-FUNCTION RASTER DECAY unit 270). The combined data is then written back into the memory for display.

The subject invention recognizes that implementing the collision detection operation at the point when the existing data and the waveform data are being combined, enables operation of this feature at an extremely high rate of speed (approximately ten million points per sec). Thus, if the existing pixel data indicates that this pixel is part of the telecom mask, a collision between the waveform pixel and the mask pixel (i.e., a violation) is detected and CONTROLLER 230 is alerted to the violation.

The input signals of the four channels are sequentially compared to the mask on a waveform basis (i.e., one pixel at a time from a single waveform until the entire waveform has been completely examined, before proceeding to pixels of the next waveform). This procedure happens so quickly that all four channels appear to a user to be tested simultaneously.

In TDS 3000 series oscilloscopes, such as the aforementioned TDS 3054, each channel is associated with a control pushbutton of a different color (e.g., red, green, yellow, and magenta), and a waveform associated with that channel is drawn onto the display screen in a corresponding color. That is, if channel two is selected by pressing a green control pushbutton, then the waveform of channel two will be drawn onto the display screen in a green color. Therefore, waveforms 430, 440, 450, and 460 of FIG. 4 will appear in four different colors. Preferably, telecom mask portions 410, 420 are drawn in a fifth color, for example, blue. Thus, a mask violation (i.e., an overwriting of at least one mask pixel by the waveform) is displayed to the user, and the color of the waveform violating the mask indicates which of the signals failed to comply with the telecom standard.

Those pixels that do not violate the mask are displayed against a black background and are easily observable due to the relatively good contrast between the waveform trace and the background. However, those waveforms that do violate the mask are displayed against the blue mask color, and are less easily observed due to the reduced contrast between the waveform trace and the blue color of the mask. In this regard, consider a green trace displayed on a blue mask. It has been found that a mask violation is more easily observed if the waveform pixels violating the mask are displayed at a higher intensity level than the pixels of that portion of the waveform that do not violate the mask. The desired increase in brightness is accomplished as follows. Assume that RASTERIZER 240 has read the current value of a given pixel from RASTER MEMORY 250 and determined that this particular pixel is part of the telecom mask. A waveform pixel to be written into that same location of RASTER MEMORY 250 will "collide" with the mask, and cause a mask violation. In order to increase the displayed intensity of this "violating" waveform pixel for better visibility, two bits of the waveform sample value are changed before storing it in RASTER MEMORY 250. This change causes a different section of INTENSITY OR COLOR MAPPER 280 to be used, which in turn, causes the displayed intensity value of that particular waveform pixel to be significantly increased over its present value. The particular data word stored in that location of RASTER MEMORY 250 indicates the intensity value of the pixel, the color of the pixel (i.e., same color as the rest of the waveform trace), but retains an indication that this particular pixel location belongs to the telecom mask. The resulting display will exhibit greater contrast of the waveform with respect to the mask at the points of the mask violation.

Figure 5:
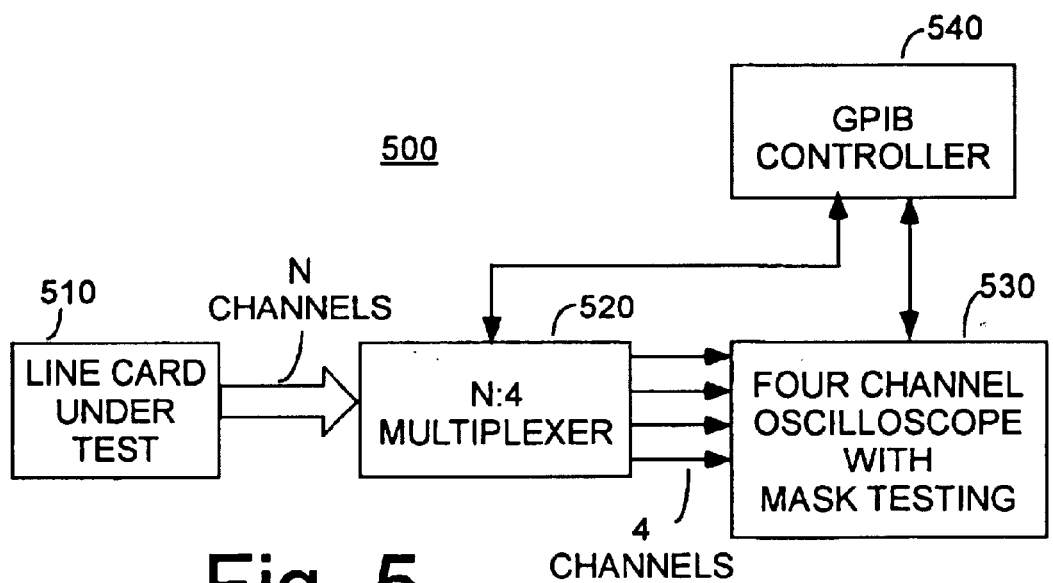
FIG. 5 shows a multiple channel telecom mask testing arrangement in accordance with the subject invention.

FIG. 5 is a simplified illustration of a multiple channel telecom mask testing arrangement 500 according to the subject invention. A line card under test 510 includes N channels of telecom signals to be tested for compliance with a telecom standard. The N channels (typically 63 channels) are applied to an N-to-4 Multiplexer 520 (in this case, a 63-to-4 multiplexer). The four output signals of Multiplexer 520 are applied to four signal input terminals of a four-channel oscilloscope 530 (such as the aforementioned TDS 3054 DPO) having telecom mask testing capability. MULTIPLEXER 520 and OSCILLOSCOPE 530 are under control of a GPIB CONTROLLER 540. GBIB CONTROLLER 540 may be a microprocessor, microcomputer, or a dedicated ASIC controller, having GPIB (general purpose interface bus) control capability.

In operation, oscilloscope 530 acquires the four signals simultaneously and sequentially determines if the signals have passed or failed the telecom mask test. This sequence is then repeated N times, for example, sixteen times, to check each channel of line card 510 in groups of four at a time. Thus, as noted above, the subject invention takes advantage of the hardware architecture shown in FIG. 2 to greatly reduce the time required to perform telecom testing of multi-channel line cards. The reduction of time is realized because, in the apparatus of the subject invention, four signals are tested against the mask simultaneously. The reduction of time is also realized because only one-fourth as many switching control signals (with any associated delay time and settling time) need to be sent to N-channel MULTIPLEXER 520 of FIG. 5 with respect to the number of switching control signals required by the apparatus of FIG. 1.

What has been described is a very high-speed method and apparatus for testing multiple channels of waveforms with respect to a telecom mask.

Although the subject invention was described with respect to a digital oscilloscope, it is herein recognized that the invention may be applicable to other test and measurement equipment, such as a logic analyzer, or a communications network analyzer, or the like.

While the X-Y points for generating the mask were described as previously stored, one skilled in the art will appreciate that the user can download his own data from a PC through a data port of the test and measurement instrument in order to create custom masks.

What is claimed is:

1. A test and measurement instrument for multi-channel mask testing comprising:
   a group of M signal input terminals for receiving M signal input from a circuit under test;
   an acquisition system coupled to said M signal input terminals for acquiring samples of a waveforms at each of said M signal input terminals;
   a controller for generating mask pixel data defining a mask;
   a memory for storing said waveform samples and said mask pixel data, said mask pixel data including an identification code;
   comparison circuitry for reading a memory location, and determining if any acquired waveform simple of said signal from each of said M signal input terminals is to be written into a memory location currently storing a mask pixel, causing a mask violation; and
   display circuitry for simultaneously displaying a representation of said mask and all of said waveforms from said M signal input terminals.

2. The test and measurement instrument of claim 1 wherein
   said comparison circuitry is a rasterizer;
   said memory is a raster memory;
   said comparison is performed by said rasterizer examining pixel data of said raster memory for said identification code as said waveform samples are composited into said raster memory; and
   said comparison being performed sequentially on a waveform basis.

3. The test and measurement instrument of claim 2, wherein each of said waveforms is displayed in a different one of M colors and said mask is displayed in an M+1 color.

4. The test and measurement instrument of claim 3, wherein
   in response to a determination of a mask violation, said rasterizer increases an intensity value of said waveform sample violating said mask prior to compositing said sample into said raster memory.

5. The test and measurement instrument of claim 1 wherein said controller generating mask pixels is a microprocessor.

6. The test and measurement system of claim 1 wherein said controller generating mask pixels is a dedicated ASIC.

7. The test and measurement instrument of claim 1 wherein:
   said test and measurement instrument is a digital oscilloscope.

8. A test and measurement system for multi-channel mask testing, comprising:
   a multiplexer having N input channels and M output channels, where N is greater than M, and M is greater than one, for selecting ones of said N-channels in groups of M-channels at a time in response to a first control signal;
   each of said N input channels being coupled to receive a signal from a respective one of N output channels of a circuit under test;
   a test and measurement instrument operating in response to a second control signal, and including:
      a group of M signal input terminals, each of said M signal input terminals being coupled to a respective one of said M signal output channels;
      an acquisition system coupled to said M signal input terminals for acquiring samples of a waveform at each of said M signal input terminals;
      a controller for generating mask pixel data defining a mask;
      a memory for storing said waveform samples and said mask pixel data, said mask pixel data including an identification code;
      comparison circuitry for reading a memory location, and determining if any acquired waveform sample of said signal from each of said M signal input terminals is to be written into a memory location currently storing a mask pixel, causing a mask violation; and
      display circuitry for simultaneously displaying a representation of said mask and all of said waveforms from said M signal input terminals; and
   a controller coupled to said multiplexer and to said test and measurement instrument for generating said first and second control signals.

9. The test and measurement system of claim 8 wherein,
   said comparison circuitry is a rasterizer;
   said memory is a raster memory;
   said comparison is performed by said rasterizer examining pixel data of said raster memory for said identification code as said waveform samples are composited into said raster memory; and
   said comparison being performed sequentially on a waveform basis.

10. The test and measurement system of claim 9, wherein each of said waveforms is displayed in a different one of M colors and said mask is displayed in an M+1 color.

11. The test and measurement system of claim 10, wherein in response to a determination of a mask violation, said rasterizer increases an intensity value of said waveform sample violating said mask prior to compositing said sample into said raster memory.

12. The test and measurement system of claim 8 wherein said controller generating mask pixels is a microprocessor.

13. The test and measurement system of claim 8 wherein said controller generating mask pixels is a dedicated ASIC.

14. The test and measurement system of claim 8 wherein:

said test and measurement instrument is a digital oscilloscope.

15. A method for performing multi-channel mask testing in test and measurement system including a test and measurement instrument having mask testing capability, comprising the steps of:

selecting M channels at a time from a group of N channels;

acquiring samples of waveforms at M input terminals coupled to said M channels;

generating mask pixel data defining a mask;

storing said waveform samples and said mask pixel data in a memory, said mask pixel data including an identification code;

comparing mask pixel data and waveform sample data by reading a memory location, and determining if a waveform sample of said acquired waveform samples is to be written into a memory location currently storing a mask pixel, causing a mask violation;

compositing said waveform samples into a raster memory;

displaying simultaneously said mask and said M waveforms on a display screen.

16. The method of claim 15 wherein, said comparing step is performed by a rasterizer examining pixel data of said raster memory for said identification code as said waveform samples are composited into said raster memory; and said comparison of said samples is made on a waveform basis.

17. The method of claim 16, further including the step of:

increasing an intensity value of a sample determined to cause a mask violation before compositing said sample in said raster memory.

18. The method of claim 15, wherein said displaying step includes:

displaying each of said waveforms in one of M different colors and displaying said mask in an M+1 color.

* * * * *